United States Patent
Veiga et al.

(10) Patent No.: US 9,494,237 B2
(45) Date of Patent: Nov. 15, 2016

(54) COMPRESSIBLE PACKING LIVE LOADING APPARATUS

(71) Applicant: Teadit N.A., Inc., Pasadena, TX (US)

(72) Inventors: Jose Carlos Veiga, Rio de Janeiro (BR); Carlos Daniel Braga Girao Barroso, Rio de Janeiro (BR)

(73) Assignee: Teadit N.A., Inc., Pasadena, TX (US)

( * ) Notice: Subject to any disclaimer, the term of this patent is extended or adjusted under 35 U.S.C. 154(b) by 105 days.

(21) Appl. No.: 14/279,815

(22) Filed: May 16, 2014

(65) Prior Publication Data

US 2014/0339450 A1 Nov. 20, 2014

Related U.S. Application Data

(60) Provisional application No. 61/825,272, filed on May 20, 2013.

(51) Int. Cl.
*F16J 15/18* (2006.01)
*F16K 41/02* (2006.01)

(52) U.S. Cl.
CPC ............... *F16J 15/186* (2013.01); *F16K 41/02* (2013.01); *Y10T 137/6069* (2015.04); *Y10T 137/8275* (2015.04)

(58) Field of Classification Search
CPC .................. Y10T 137/6069; Y10T 137/8275; F16K 41/02; F16J 15/186; F16J 15/184; F16J 15/185
USPC ....................... 137/315.28; 251/214; 277/523
See application file for complete search history.

(56) References Cited

U.S. PATENT DOCUMENTS

| | | | |
|---|---|---|---|
| 3,113,755 A * | 12/1963 | Stevens | F16F 15/06 248/616 |
| 5,024,453 A | 6/1991 | Suggs | |
| 5,192,049 A | 3/1993 | Ridge | |
| 5,456,447 A | 10/1995 | Reynolds | |
| 5,709,514 A | 1/1998 | Suggs et al. | |
| 6,622,987 B2 | 9/2003 | Sterud | |
| 2011/0006242 A1 | 1/2011 | Hutchens et al. | |

OTHER PUBLICATIONS

International Search Report and Written Opinion issued for PCT/US2014/038464 dated Oct. 1, 2014, 11 pgs.

* cited by examiner

*Primary Examiner* — Matthew W Jellett
(74) *Attorney, Agent, or Firm* — Haynes & Boone, LLP

(57) ABSTRACT

A live-loading assembly for exerting a sealing force on a compressible packing structure of a fluid handling device, such as a valve or pump, includes a pair of gland bolts each movably extending through opposite end lids of a tubular cartridge and through a Belleville spring stack disposed within the cartridge and bearing on a tubular piston rod having an end portion extending outwardly through one of the lids and having a spring force indicating scale disposed thereon. When packing force adjustment nuts are tightened onto the bolts, to increase the compression force exerted on the packing structures, one of the lids on each cartridge moves along the associated exposed piston rod scale to thereby provide a visual indication of the amount of spring force being created by each tightened nut.

22 Claims, 5 Drawing Sheets

COMPRESSIBLE PACKING LIVE LOADING APPARATUS

CROSS-REFERENCE TO RELATED APPLICATION

The present application claims the benefit of the filing date of provisional U.S. patent application No. 61/825,272 filed May 20, 2013. The entire disclosure of the provisional application is hereby incorporated herein by this reference.

FIELD OF THE INVENTION

The present invention generally relates to apparatus for live-loading a valve or other fluid handling device packing that indicates the actual force being exerted on the packing. The apparatus can also indicate the operational ranges for different packing sets the apparatus is designed to work with. More particularly, the present invention relates to a dynamic actuator that compresses during packing expansion and expands when the packing relaxes, indicating at all times the actual force being exerted on the packing.

BACKGROUND

Mechanical equipment used in the handling of liquids or gases may be subject to leakage problems, for example, valve stems, shafts or rods. The successful use of such equipment to contain and handle liquids or gases requires adequate control of this leakage, and several sealing methods and devices have been used to achieve such leakage control.

Compression packing is one of the most common devices used in sealing, and is used in many industries, including chemical, pharmaceutical, marine, sewage, and others. Compression packing involves the insertion of the packing made from soft, pliant materials into the space (i.e., the stuffing box) between a rotating or reciprocating member of a pump or valve and the body of the pump or valve. When pressure is transmitted to the packing materials, the materials expand against the stuffing box and the valve or pump member, thereby creating a seal. Compression may be applied to packing by means of packing bolts which are attached at one end to a clamp around the valve body and at the other end to a spigot, a flange or other projection bearing on, integral with or attached to the gland or sleeve which bears against the packing. Tightening of the packing bolts, therefore, increases the pressure on the packing and thereby exerts the radial pressure on the stem and the stuffing box. The resulting radial pressure of the packing onto the stem and stuffing box provides the desired seal so long as the radial pressure exceeds the pressure of fluid in the valve.

Improper loading is a condition wherein the sealing compression exerted by the gland follower on the packing is either insufficient or excessive. Packing volume variations and bolt creep are contributing elements of improper loading, because both will induce changes in the compressive force applied by the gland follower on the packing. But inaccurate torquing of the gland bolts by workers may also cause improper loading. Such inaccurate torquing may be the result of human errors. However it is recognized that even when torque wrenches are used by workers they are often inaccurate, resulting in improper loading. Leaks thus occur from the outset because the load on the packing is insufficient to achieve or maintain a seal, or excessive to damage the packing. Fluid leakage along the shaft of valves and pumps has long been recognized as a serious problem in power and industrial plants. In recognition of this problem, various attempts have been made to obtain leak free performance and reduce maintenance requirements for a pump or a valve. For example, improved packing materials have been developed for a larger range of temperatures, better chemical resistance and improved coefficient of expansion characteristics. Torque values have been established for the bolts connecting the gland follower to the stuffing box. Installers follow such specifications to apply a proper load to the packing to achieve a seal, but as discussed above may not attain a proper load. Several companies have initiated routine maintenance programs that include re-torquing of gland follower bolts. Such re-torquing is done frequently because of the significant risk posed by improperly loaded gland bolts and the resulting leakage of fluid from the apparatus.

Another attempt to obtain leak free performance and reduce maintenance requirements involves live-loading of the gland follower. Live-loading (or "dynamic loading") refers to the mounting of compressed springs on the gland follower whereby a continuous force is exerted on the gland follower to insure a regular compressive pressure is exerted on the packing. Although coil springs could be used, it is conventional practice to use so-called Belleville springs which are essentially formed as a stacked series of dished washers that flatten when compressed. A significant amount of force is required for this compression. Such springs have higher compression rating than simple coil springs.

The use of Belleville springs provides a live-load system which can continuously compensate for changes that may take place in the packing under operating conditions of the valve, for example high pressures and temperatures. Polytetrafluoroethylene (PTFE) packings for instance, are very susceptible to undergo volume changes when exposed to temperature variations since the thermal expansion coefficient of PTFE is nearly ten times greater than that of steel. In such cases, the volume of the material may reduce under operating conditions and, whereas this could harmfully affect the sealing in an unsprung valve, the spring force will compensate for this reduction and maintain the packing under pressure. Alternatively, if the packing volume increases, the pressure on the stem, gland follower and stuffing box in an unsprung valve could increase too much and possibly cause sticking of the stem, extrusion of the packing or both. The live-loaded valve however can accommodate the pressure increase by means of further compression of the springs.

Thus, the live-loaded packing construction can provide a useful amount of self-adjustment, but the exact amount of force actually being exerted on the packing typically remains unknown. Accordingly, it is very difficult to precisely determine if the correct load is actually being applied to the compressible packing material.

Therefore, a need exists to provide an improved dynamically-loaded packing system that not only supplies the amount of self-adjustment necessary to maintain adequate pressure on the packing, but also indicates the force being exerted on the packing at all times to thereby prevent improper loading of the packing system. It is to this need that the present invention is primarily directed.

DETAILED DESCRIPTION

Figure 1:
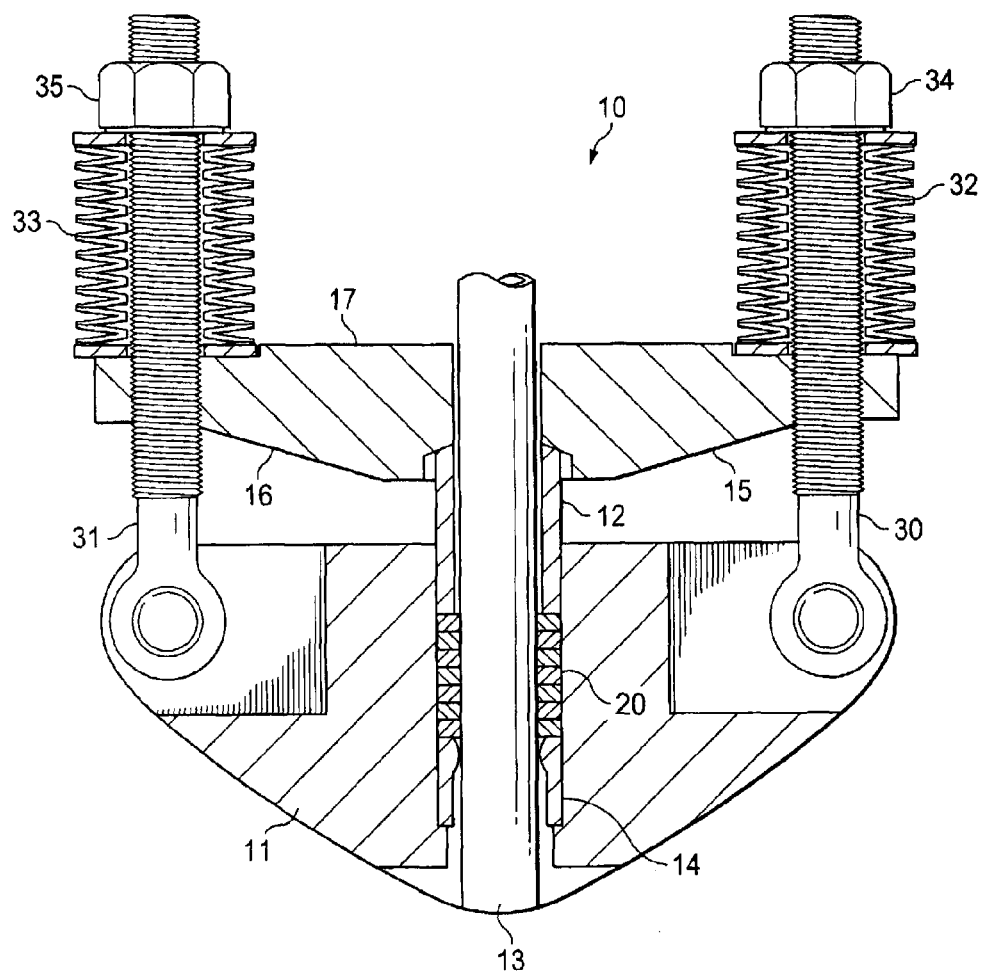
FIG. 1 is a partially cross-sectioned diagrammatic representation of a conventional live-load valve construction used to exert a compressive force on packing material.

Reference is now made to the drawings that illustrate certain embodiments of the present invention. It should be understood that the invention is not limited to the embodiments shown in the drawings.

In FIG. 1 a conventional valve 10 has a body 11 comprising a bonnet and a yoke with a sleeve or gland 12 surrounding a central axial passageway through which passes a valve stem 13, movement of which opens and closes the valve in a conventional manner. The lower end of sleeve 12 bears on and compresses a packing structure representatively in the form of stacked compressible packing rings 20 which surround and exert radial pressure on that portion of stem 13 passing through the packing structure. Beneath the packing structure is a fixed ledge or body portion 14 against which the lower part of the packing structure bears.

At the upper end of sleeve 12 is a gland follower spigot 17 in the form of an integral pair of arms 15,16 extending in radially opposed directions from the stem. The gland follower spigot 17 has a central bore through which stem 13 passes and a bore adjacent the radially outer end of each arm 15,16 to receive gland bolts 30,31. Springs 32,33 are positioned on each bolt above its respective arm 15,16 and tightened by nuts 34,35 on the threaded ends of the bolts 30,31. The compression of springs 32,33 which may be Belleville springs transmits an adjustable load via spigot 17 and sleeve 12 to the packing rings 20 and thereby maintains a radial pressure on stem 13 and stuffing box to prevent leakage of fluid from the valve. As is clear from FIG. 1 there is no indication of the force being applied through the spigot 17 to the packing rings 20.

Figure 2:
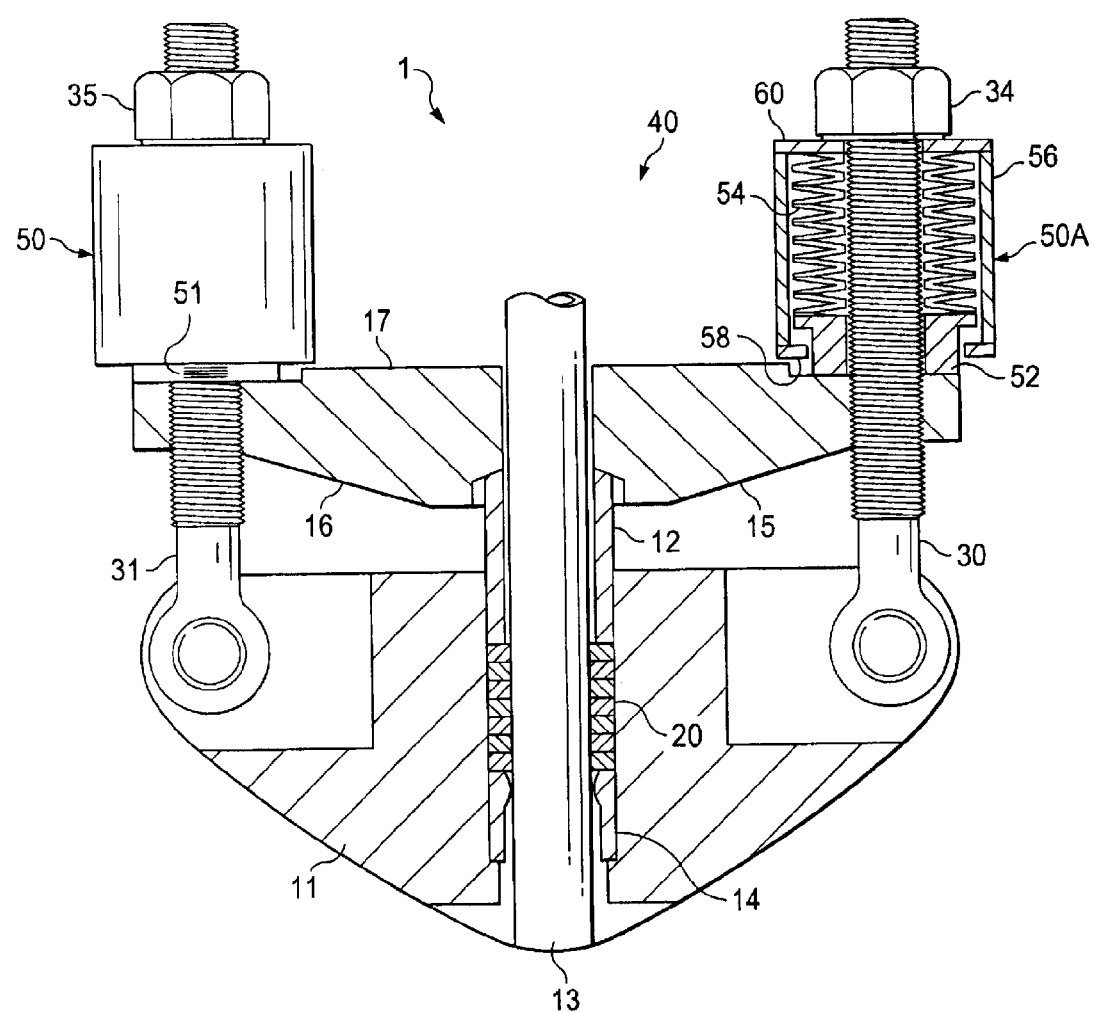
FIG. 2 is a partially cross-sectioned view of an embodiment of the present invention illustrating a live-loading assembly attached to a gland follower and a stuffing box.
Figure 3:
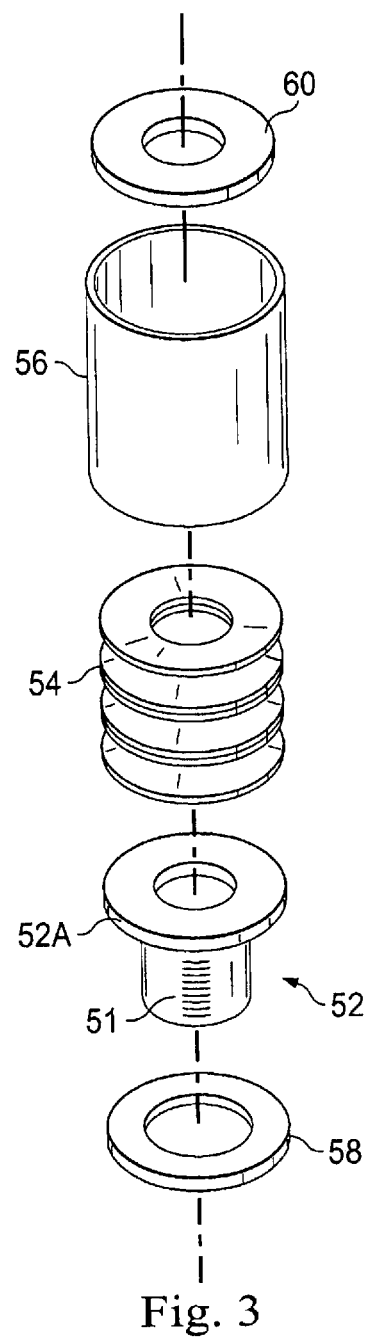
FIG. 3 is an exploded perspective view of a portion of the live-loading assembly shown in FIG. 2.

FIGS. 2 and 3 illustrate a dynamically-loaded packing system assembly 50 (which may be alternatively referred to herein as a "live-loaded" packing system assembly) according to embodiments of the present invention. Assembly 50 includes a spring cartridge body 56, bottom and top cartridge lids 58 and 60, a tubular spring structure preferably in the form of a stack of Belleville springs 54, and a calibrated piston rod 52 with an exerted force scale marking 51 (referred to hereinafter simply as "scale 51") suitably formed thereon. Cartridge lids 58,60 are secured to the ends of their associated cartridge body 56 by any suitable method including, but not limited to, welding, gluing, press-fitting or threading.

The cartridge body 56 is preferably a cylindrical open-ended tube. The top lid 60 and the calibrated piston rod 52 have bores, preferably of the same size as the inner diameters of the Belleville springs 54, to receive one of the gland bolts 30,31. The clearance between the stack of Belleville springs 54 and the wall of the spring cartridge 56 is preferably equal or higher than the clearances between the Belleville springs 54 and the gland bolt. The bottom lid 58 has a bore through which a bottom end portion of the calibrated piston rod 52 downwardly passes. The clearance between the calibrated piston rod 52 and the bottom lid 58 is preferably equal to or greater than the clearances between the stack of Belleville springs 54 and their associated gland bolts 30,31.

The height of the spring cartridge body 56 is great enough to freely accommodate the stack of Belleville springs 54 and an annular piston crown 52A formed on the top end of the tubular calibrated piston rod 52. As shown in FIG. 2, the bottom end of the piston rods 52 bear against the top sides of the arms 15,16 so that the spring cartridge bodies 56 may move up and down along their associated piston rods 52. The distance between the stack of Belleville springs 54 and the cartridge lids 58,60 is sufficiently large so as not to compress the springs 54 before the bolt nut 34 or 35 is tightened.

The scale 51 of the calibrated piston rod 52 indicates the force being applied through the spigot 17 and sleeve 12 to the packing rings 20. For instance, in FIG. 2 the casing 1 is representatively the casing of a pump, a valve or other type of fluid handling device that use a packing seal to reduce or eliminate leaks. For discussion purposes the casing 1 will be considered part of a conventional valve 40. The partially cross-sectioned view of valve 40 (FIG. 2) includes an embodiment of assembly 50 of the present invention which maintains and indicates, via the scale 51, the compressive force being exerted on the packing structure representatively in the form of the stacked packing rings 20. The cross-sectionally depicted portion 50A of the dynamically-loaded packing system assembly 50 clearly illustrates a partially compressed assembly where the partially compressed springs 54 thrust the calibrated piston rod 52 against the spigot 17. The nuts 34,35 respectively disposed on the bolts 30,31 retain the live-load on the stack of packing rings 20.

When the nuts 34 35 are tightened, the spring cartridges, each comprising the top lid 60 together with the cartridge body 56 and the bottom lid 58, are moved downwardly (using FIG. 2 as a reference) against the resilient forces of the springs 54 that downwardly bear on the annular crowns 52A of the calibrated piston rods 52. The compression of the each spring stack 54 applies vertical load on the associated calibrated piston rod 52 that increases as the cartridge assembly 60,58,56 moves downwardly along the calibrated piston rod 52. The actual spring forces being applied on the gland follower arms 15,16 are visually indicated on the exposed scale 51 (and/or recommended maximum and minimum operational force ranges for the packing system and/or a single recommended operational force for the packing system) with the bottom cartridge lids 58 working as indicators which move vertically along the exposed scales 51.

Figure 4:
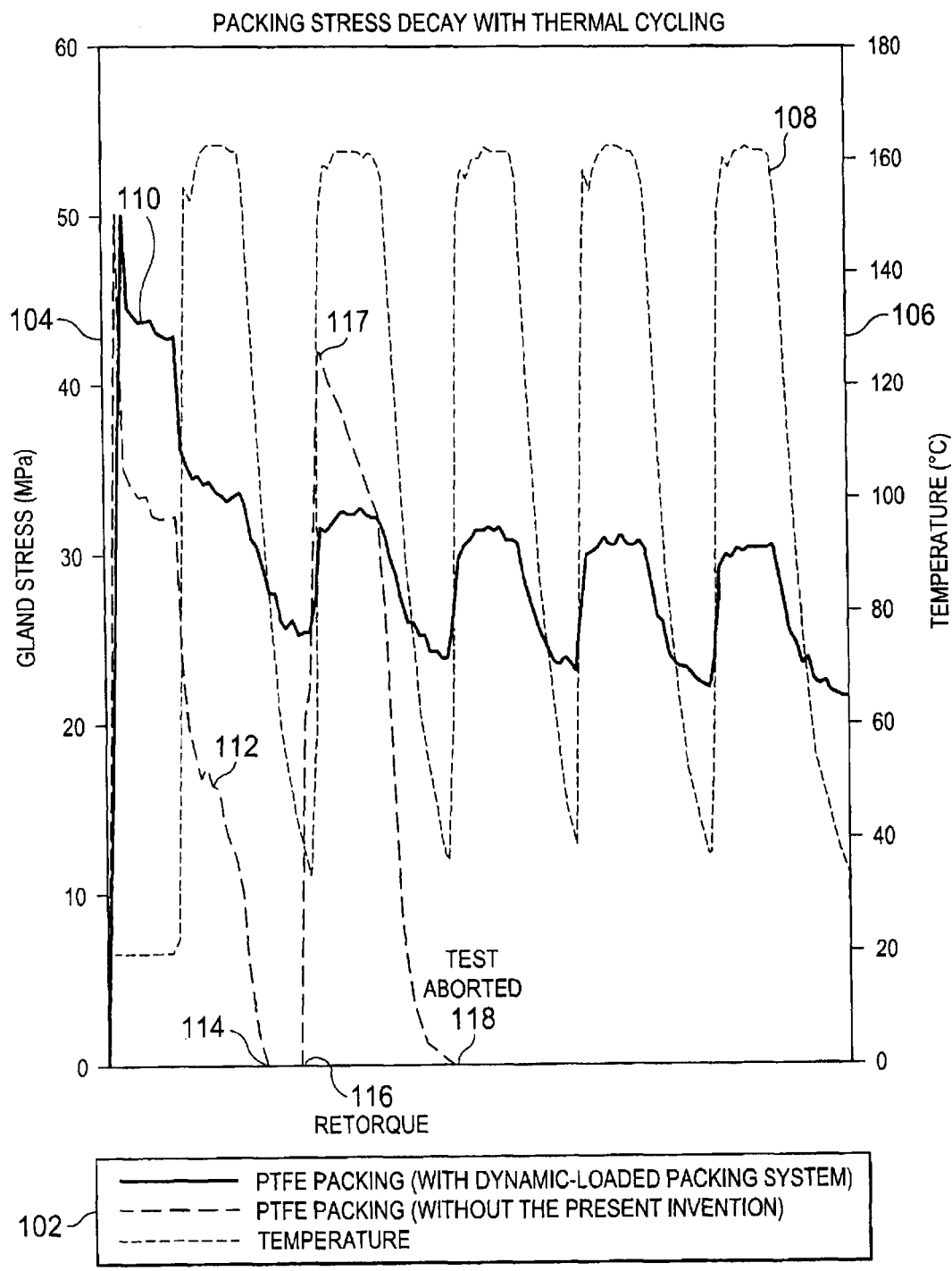
FIG. 4 is a comparative graph of packing gland stress decay with thermal cycling of an expanded PTFE (ePTFE) packing using a live-loading assembly according to an embodiment of the present invention compared with the same packing used without such live-loading assembly.

FIG. 4 is a graph indicating the comparative behavior of five expanded PTFE (ePTFE) packing rings installed in a packing box and exposed to temperature cycles from room temperature to 160° C. using live-loading apparatus embodying principles of the present invention (as indicated by line 110), and without the use of such live-loading apparatus (as indicated by the line 112). The left vertical axis 104 indicates the gland stress values in [MPa]. The right vertical axis 106 indicates the temperature values in [° C.], while the dotted line 108 shows the test thermal cycling. The legend 102 identifies the graph curves.

The solid line 110 indicates the functionality of the dynamically-loaded packing system 50 that absorbs the packing thermal expansion and contraction. The load applied on the packing was recorded, converted to stress and displayed on the graph. The dashed line 112 shows the behavior of the same packing without using the dynamically or live-loaded packing system of the present invention. After the first thermal cycle the gland stress decreased to zero (point 114), and a retorque (at point 116) was required for the second thermal cycle. The increase in temperature led to an increase in the gland stress (at point 117) higher than the increase monitored in the test using the dynamically-loaded packing system 50. After a system cool down, gland stress was again reduced to zero (at point 118) and the test aborted due to the system inability to maintain the gland stress.

Figure 5:
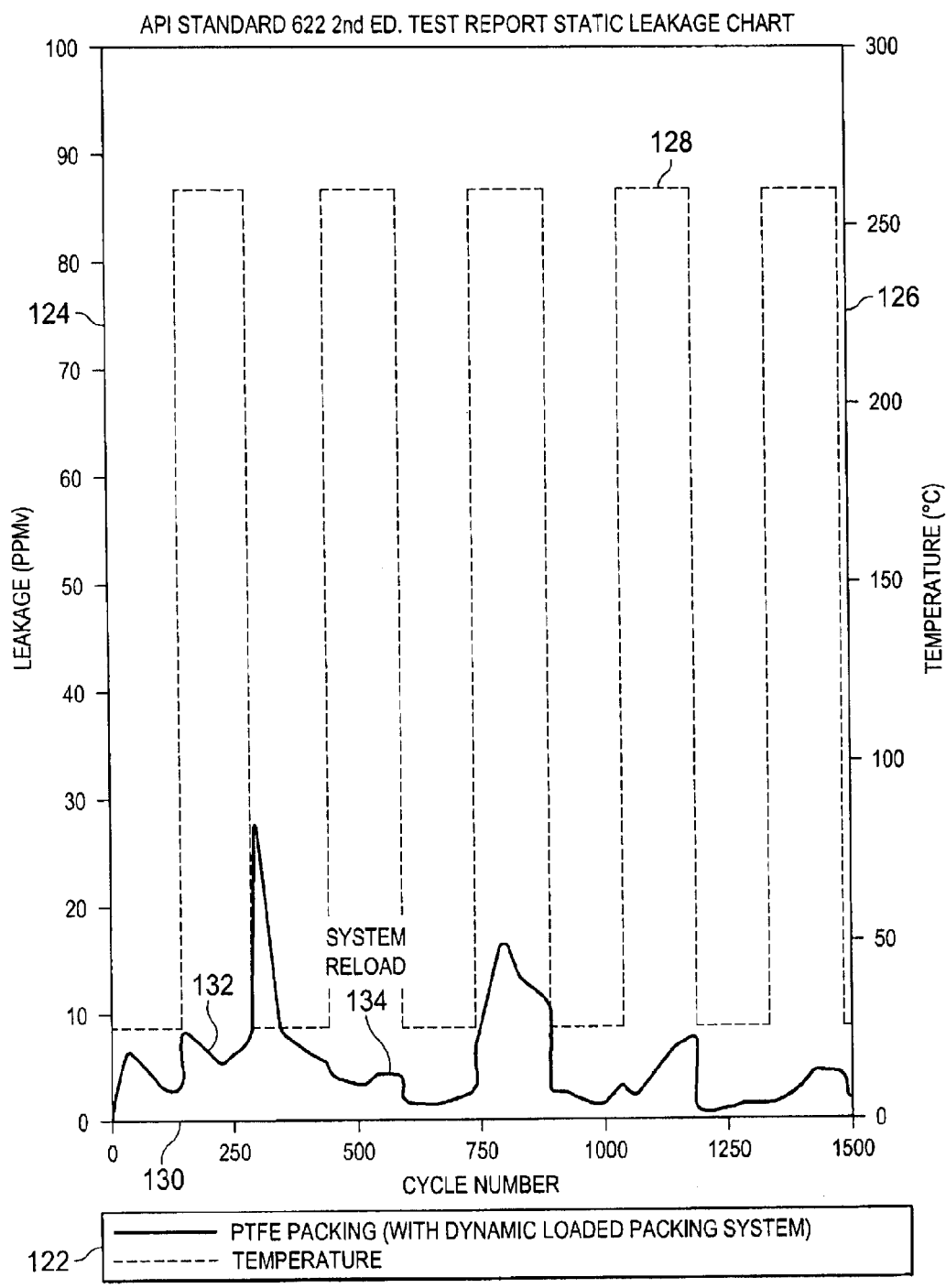
FIG. 5 is a graph illustrating API 622 fugitive emission test results for an ePTFE packing used in conjunction with a live-loading assembly according to an embodiment of the present invention.

FIG. 5 is a graph indicating test results of the dynamically-loaded packing system 50 of the present invention in combination with an ePTFE packing following the test procedure described in American Petroleum Institute Standard, API 622 STD-Type Testing of Process Valve Packing for Fugitive Emissions, Second Edition. The left vertical axis 124 indicates the leakage values of methane gas in parts per million of volume [ppmv]. The right vertical axis 126 indicates the temperature values in [° C.] while the dotted line 128 shows the test thermal cycling. The legend 122 identifies the graph curves and the horizontal axis 130 the number of mechanical cycles performed. The test was conducted according to the standard with five thermal cycles with the temperature ranging from room temperature to 260° C. using the present invention. The ePTFE packing with dynamically-loaded packing system 50 endured the whole test with only one gland adjustment keeping stem seal leakage average value under 6 ppmv. The adjustment was applied when the scale 51 indicated a load force below the desired value suggested by the packing manufacturer.

The foregoing detailed description is to be clearly understood as being given by way of illustration and example only, the spirit and scope of the present invention being limited solely by the appended claims.

What is claimed is:

1. A dynamically-loaded packing system for installation on gland follower bolts to exert thrust through a gland follower to a fluid sealing packing structure, said dynamically-loaded packing system comprising:
   a spring cartridge having a cylindrical body with a top lid secured to a top end thereof and having a central aperture for receiving a first gland follower bolt, and a bottom lid secured to a bottom end of said cylindrical body and having a central aperture with a diameter smaller than an inner diameter of said cylindrical body;
   a stack of Belleville springs disposed within said cylindrical body; and
   a calibrated piston rod movably received in said central aperture of said bottom lid and having a first end portion projecting outwardly through said central aperture of said bottom lid, said piston rod having an aperture extending therethrough for movably receiving the first gland follower bolt, said first end portion of said calibrated piston rod having a visible scale disposed thereon, wherein said calibrated piston rod has a second end portion within the spring cartridge having a diameter larger than the central aperture of the bottom lid such that the second end portion is unable to pass through the central aperture,
   wherein, with the first gland follower bolt movably extended through said piston rod, said stack of Belleville springs, and said central aperture of said top lid, and with a nut tightened onto the first gland follower bolt to compress said stack of Belleville springs, said scale provides a visual indication of the magnitude of spring compression.

2. The dynamically-loaded packing system of claim 1 wherein:
   the position of said bottom end of said cylindrical body on said scale provides a visual indicia of the magnitude of compression of said stack of Belleville springs.

3. The dynamically-loaded packing system of claim 1 wherein:
   said scale is indicative of the actual thrust being transmitted to the packing structure by the compressed stack of Belleville springs.

4. The dynamically-loaded packing system of claim 1 wherein:
   said scale is indicative of a recommended maximum and minimum operational force range for the packing structure.

5. The dynamically-loaded packing system of claim 1 wherein:
   said scale is indicative of a recommended operational force designed for the packing structure.

6. The dynamically-loaded packing system of claim 1 wherein:
   the packing structure thermal expansion and contraction are absorbed by said dynamically-loaded packing system, and the variation of the spring force of said stack of Belleville springs is indicated on said scale.

7. The dynamically-loaded packing system of claim 1 wherein said dynamically-loaded packing system, utilized in conjunction with ePTFE or PTFE packing material, permits such packing material to endure five thermal cycles, from room temperature to 260° C., with 1510 mechanical cycles, as described in API 622 $2^{nd}$ Ed., keeping leakage under 100 ppmv with no more than one gland adjustment.

8. The dynamically-loaded packing system of claim 1 wherein said dynamically-loaded packing system, utilized in conjunction with a packing material comprising flexible graphite, carbon, graphite with metal reinforcement or any combination of the above, or PTFE, permits such packing material to endure five thermal cycles, from room temperature to 260° C., with 1510 mechanical cycles, as described in API 622 $2^{nd}$ Ed., keeping leakage under 100 ppmv with no more than one gland adjustment.

9. A dynamically-loaded apparatus for installation on a gland follower bolt secured to a fluid handling device body in which a fluid sealing packing structure is disposed and compressible by a movable gland follower, said dynamically-loaded apparatus being operable to exert thrust through the gland follower to the packing structure and comprising a spring cartridge assembly having:
   a tubular cartridge body having first and second ends spaced apart along an axis;
   a generally tubular spring structure coaxially disposed within said cartridge body and having a first end bearing against said first end of said cartridge body, and a second end; and
   a tubular piston structure coaxially and slidably disposed within said cartridge body and having a first end portion against which said second end of said spring structure bears, and a second end portion axially projecting outwardly through said second end of said cartridge body and having a calibrated scale thereon, wherein a diameter of the first end portion is larger than a diameter of the second end portion,
   said spring cartridge assembly being mountable on the gland follower bolt, with said second end portion of said piston structure bearing against the gland follower, by axially passing the bolt through said piston structure, said spring structure and said first end of said cartridge body, and then tightening a nut onto the gland follower bolt to axially compress said spring structure and move said cartridge body along said second end portion of said piston structure, said scale providing a visual indication of the axial distance which said spring structure has been compressed.

10. The dynamically-loaded apparatus of claim 9 wherein:
said spring structure is defined by a stack of Belleville springs.

11. The dynamically-loaded apparatus of claim 9 wherein:
the position of an end of said cartridge body on said scale provides a visual indicia of the magnitude of spring compression.

12. The dynamically-loaded apparatus of claim 9 wherein:
said scale is indicative of the actual thrust being transmitted to the packing structure by the compressed spring structure.

13. The dynamically-loaded apparatus of claim 9 wherein:
said scale is indicative of a recommended maximum and minimum operational force range for the packing structure.

14. The dynamically-loaded apparatus of claim 9 wherein:
said scale is indicative of a recommended operational force designed for the packing structure.

15. The dynamically-loaded apparatus of claim 9 wherein:
the packing structure thermal expansion and contraction are absorbed by said dynamically-loaded apparatus, and the variation of the spring force is indicated on said scale.

16. The dynamically-loaded apparatus of claim 9 wherein said dynamically-loaded apparatus, utilized in conjunction with ePTFE or PTFE packing material, permits such packing material to endure five thermal cycles, from room temperature to 260° C., with 1510 mechanical cycles, as described in API 622 $2^{nd}$ Ed., keeping leakage under 100 ppmv with no more than one gland adjustment.

17. The dynamically-loaded apparatus of claim 9 wherein said dynamically-loaded apparatus, utilized in conjunction with a packing material comprising flexible graphite, carbon, graphite with metal reinforcement or any combination of the above, or PTFE, permits such packing material to endure five thermal cycles, from room temperature to 260° C., with 1510 mechanical cycles, as described in API 622 $2^{nd}$ Ed., keeping leakage under 100 ppmv with no more than one gland adjustment.

18. A fluid handling apparatus incorporating a dynamically-loaded packing apparatus and comprising:
a body with an opening extending therethrough;
a shaft extending through said opening and being movable relative to said body;
a compressible packing structure disposed within said opening and circumscribing said shaft;
a tubular gland member circumscribing said shaft and being axially movable within said opening to compress said packing structure;
a gland spigot structure secured to said tubular gland member for movement therewith;
spaced apart first and second bolts having first end portions thereof secured to said body, said first and second bolts extending from said body and having second end portions;
first and second spring cartridge assemblies extending along axes and through which said first and second bolts respectively and coaxially extend, each of said first and second spring cartridge assemblies including:
a tubular cartridge body having spaced apart first and second ends,
a stack of Belleville springs coaxially disposed within said cartridge body and having a first end bearing against said first end of said cartridge body, and a second end,
a tubular piston structure coaxially and slidably disposed within said cartridge body, said piston structure circumscribing one of said bolts, having a first end portion against which said second end of said stack of Belleville springs bears, and having a second end portion axially projecting outwardly through said second end of said cartridge body and having a calibrated scale thereon, said second end portion of said tubular piston structure bearing against said gland spigot structure, wherein a diameter of the first end portion is larger than a diameter of the second end portion; and
nuts threaded onto said second end portions of said first and second bolts and being tightenable thereon to drive said cartridge bodies along said first and second bolts toward said gland spigot structure and thereby compress said stacks of Belleville springs, resulting positions of said second ends of said cartridge bodies along said scales providing visual indications of the distances the stacks of Belleville springs have been compressed.

19. The fluid handling apparatus of claim 18 wherein:
said fluid handling apparatus is a valve.

20. The fluid handling apparatus of claim 18 wherein:
said fluid handling apparatus is a pump.

21. The dynamically-loaded apparatus of claim 9 wherein:
the second end of the tubular cartridge body has a central aperture, wherein the diameter of the first end portion is larger than a diameter of the central aperture such that the first end portion is unable to pass through the central aperture.

22. The fluid handling apparatus of claim 18 wherein:
the second end of the tubular cartridge body has a central aperture, wherein the diameter of the first end portion is larger than a diameter of the central aperture such that the first end portion is unable to pass through the central aperture.

* * * * *